O. A. NENNINGER.
COFFEE URN.
APPLICATION FILED OCT. 7, 1907.
914,302.
Patented Mar. 2, 1909.
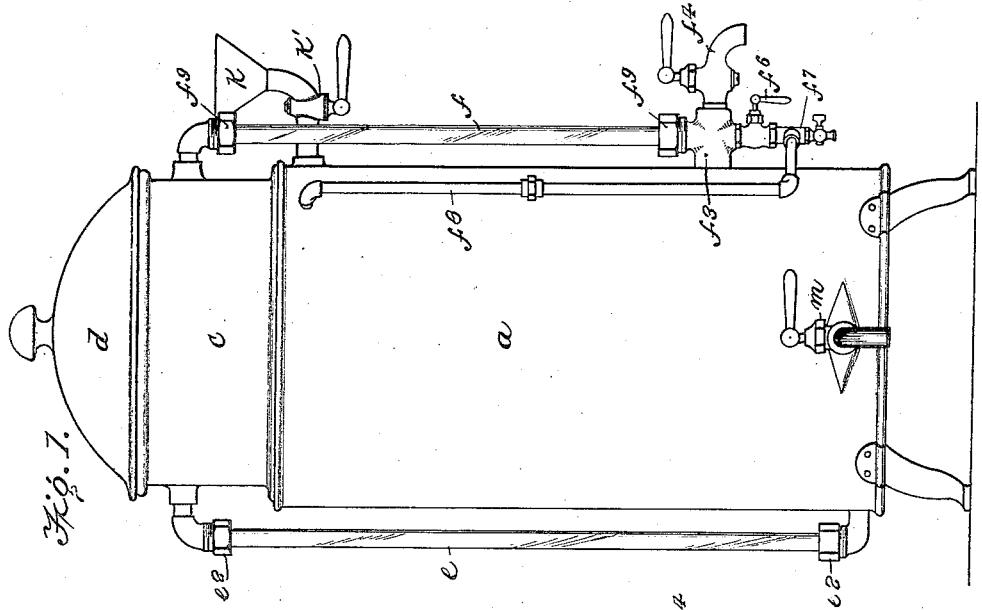
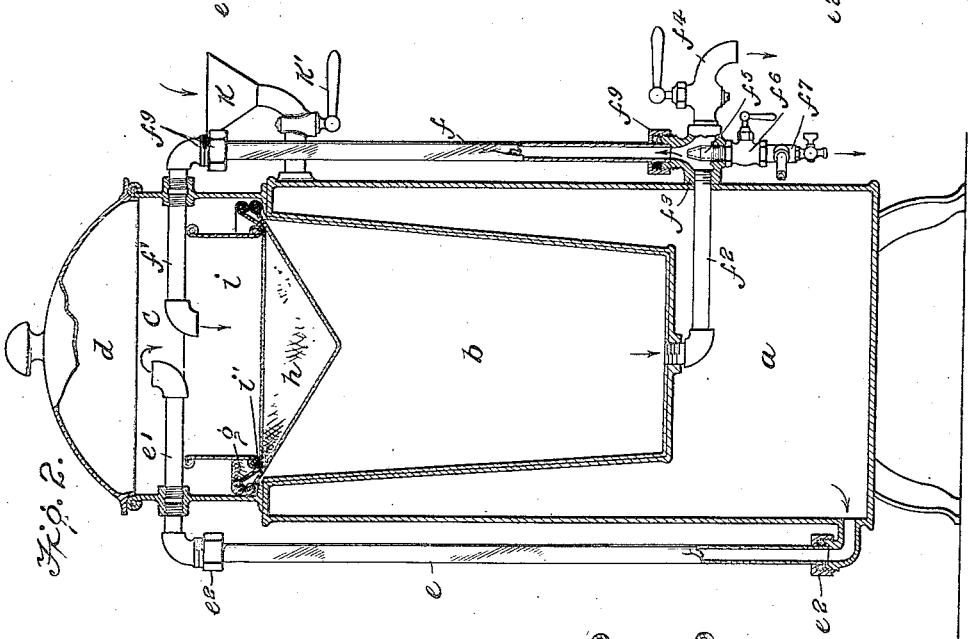
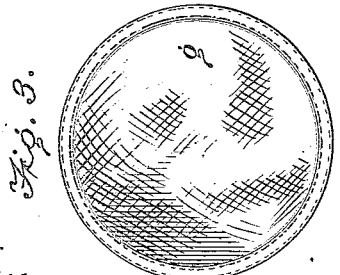
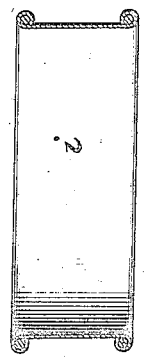
WITNESSES
INVENTOR
Oscar A. Nenninger
BY
ATTORNEYS

UNITED STATES PATENT OFFICE.

OSCAR A. NENNINGER, OF EL PASO, TEXAS.

COFFEE-URN.

No. 914,302.  Specification of Letters Patent.  Patented March 2, 1909.

Application filed October 7, 1907. Serial No. 396,204.

*To all whom it may concern:*

Be it known that I, OSCAR A. NENNINGER, a citizen of the United States, residing at El Paso, in the county of El Paso and State of Texas, have invented a new and useful Improvement in Coffee-Urns, of which the following is a specification.

The object of this invention is to provide a coffee urn in which the coffee may be extracted in a short space of time, by causing boiling water to percolate through the mass of ground berries supported above an inner vessel for holding the extract. Improved means are also provided for passing the liquid repeatedly through the mass, for the purpose of increasing the strength of the extract. The flow of the liquid in either case is produced by steam generated in the boiler or outer vessel, the pressure of which is used to circulate the liquid, and which can be controlled by means of a stop cock.

Various other improvements and advantages will be apparent from the following description.

In the accompanying drawings wherein the invention is illustrated, Figure 1 is a side elevation of the urn. Fig. 2 is a vertical section. Fig. 3 is a detail in plan of the cover of the coffee bag. Fig. 4 is a detail in section of a ring which rests on said cover.

Referring specifically to the drawings, $a$ is an air-tight boiler made of copper (or any metal suited to hold hot water) having at the upper part a cock $k'$ with funnel marked $k$, for filling in water. On the top of airtight boiler $a$, is soldered a ring $c$, and covered with lid $d$ made of copper or glass.

On the side of boiler $a$, is a glass tube $e$, connected at the lower end to the boiler, and at the upper end to the top $c$, inside of which it is connected to a nipple with elbow marked $e'$ running almost to center of ring $c$ and turned upwards. On the opposite side of the boiler is another glass tube $f$, connected at top and bottom the same as $e$, on opposite side, and having a nipple $f''$ with elbow turned down, extending almost to the center of ring $c$. Both nipples are made to screw in and to be taken off easily.

The inner vessel or extract holder is part of boiler $a$, and is lined with aluminum or porcelain or any material not affected by coffee. A pipe $f^2$ is connected to the bottom of vessel $b$, and is fastened to inner side of boiler $a$, and passes through to an injector casing $f^3$ which is made of an ordinary fitting tee, to which is screwed in a cock $f^4$ for letting coffee out of vessel $b$. In the bottom of tee $f^3$, is a small injector nozzle or pipe tapered at the top running up into the tee and marked $f^5$, and screwed in so that the top is a little above the center of the tee, and directly under the tube $f$. To this nozzle is screwed a cock $f^6$, and to the bottom a tee and pet cock $f^7$. To this is connected a small pipe $f^8$ extending to the top of the boiler $a$ and screwed or soldered to the side thereof. The glass tubes $e$ and $f$ on the side of the boiler $a$ are connected with the usual unions at top and bottom, indicated at $e^2$ on one side and $f^9$ on the other.

On the top of the extract holder $b$ are placed two rings $g$ and $h$. One of the rings has muslin sewed across so as to form a flat cover $g$ and the other ring also has muslin sewed across so as to form a cone-shaped bag $h$ so as to hold ground coffee. On the top of the flat cover $g$ is placed a ring $i$ which is pressed down at point $i'$ so that it stretches the cover $g$ until it joins with $h$ and forms a tight joint.

Both nipples $e'$ and $f'$ hold down the ring $i$, cover $g$ and cone shaped bag $h$, which however can be easily taken out by unscrewing the two nipples.

In using the urn, the boiler is filled with water through cock $k'$ up to dotted line or about half way up. Coffee is placed into the cone shaped bag $h$ and covered with cover $g$. The ring $i$ is pressed down so that the fabric of the cover $g$ and cone-shaped bag $h$ form a tight joint at $i'$. The nipples are screwed in to hold ring $i$ and cover $g$ in place, the nipple $e'$ being screwed so as to have its elbow upwards and nipple $f'$ with its elbow downwards. The boiler is heated by gas or any other means. As soon as the water is at boiling point all the cocks $k'$, $f^4$, $f^6$, and $f^7$, are closed, and as soon as there is enough steam pressure the water will be forced up glass tube $e$ and will overflow at top of elbow $e'$ and fill ring $i'$. The flow can be regulated with stop cock $k'$, by opening or shutting the same according to hot water needed. As the boiling hot water percolates through the coffee in the cone shaped bag it extracts the coffee slowly and is stored in holder $b$. The hot water can be regulated to any quantity desired by opening or shutting cock $k'$ which varies the steam pressure by allowing more or less steam to escape.

When enough hot water has been passed through the ground coffee, which can be seen as holder $b$ fills up, at glass tube $f$, and the coffee is not strong enough, cock $k'$ is closed again and cock $f^6$ is opened. The steam jet at the nozzle $f^5$ will then force the coffee up the tube $f$ to nipple $f'$ and into ring $i$ and it will percolate through the ground coffee. This may be continued until it has the proper strength. Cock $f^7$ is merely to let out any condensed water in tube $f^8$, or to expel air when filling boiler with water. Cock $m$ is for hot water or to empty boiler.

The tubes $e$ and $f$ answer two purposes, to see contents in urn, both water and coffee, and for forcing both coffee and water to top of urn. This water must boil before it will rise and percolate through the ground coffee. Forcing the hot coffee extract through the ground beans over and over until it gets the proper strength is a decided advantage. Both hot water and coffee extract can be run in over the ground beans and regulated by merely opening or shutting cocks $k'$ and $f^6$. There is no danger of explosion and both tubes are always open on the top. The nipples $e'$ and $f'$ can be readily replaced or removed by removing the cover $d$, and when the nipples are taken off, the ring $i$ and the bag can be removed.

I claim—

1. The combination of a boiler, a holder therein for the extract, a bag above said holder, pipes extending from the bottom of the boiler and holder respectively to outlets above said bag and arranged to discharge into the same, means to control steam pressure within the boiler to regulate the flow of water therefrom to the bag, and means actuated by steam in the boiler to cause flow of extract from the holder to said bag.

2. The combination of a boiler and holder within the same, a bag above the holder, pipes extending respectively from the boiler and the holder and having removable nipples over the bag and adapted to discharge thereinto, and a casing above the bag and through which said pipes extend, said casing inclosing the bag and the nipples, the latter being removable to allow the removal of the former.

3. The combination of a boiler, a holder therein, a casing above the boiler, pipes extending respectively from the bottom of the boiler and holder upwardly outside the boiler and through the casing and having removable nipples therein, a bag at the top of the holder, a porous cover for said bag, a ring fitting upon said cover under the nipples, and means to produce and control flow of liquid through said pipes respectively.

OSCAR A. NENNINGER.

Witnesses:
 A. H. PARKER,
 R. J. OWEN.